United States Patent [19]
Weisburn et al.

[11] Patent Number: 5,215,189
[45] Date of Patent: Jun. 1, 1993

[54] REUSABLE END LOADED CASSETTE SECURITY PACKAGE WITH END EXPANSION MEANS

[75] Inventors: James T. Weisburn, Massillon; Andrew W. Moock, Brecksville; Nicholas M. Sedon, N. Canton, all of Ohio

[73] Assignee: Alpha Enterprises, Inc., East Canton, Ohio

[21] Appl. No.: 867,773

[22] Filed: Apr. 13, 1992

Related U.S. Application Data

[63] Continuation-in-part of Ser. No. 747,296, Aug. 19, 1991, abandoned.

[51] Int. Cl.[5] .................... B65D 55/02; B65D 85/672
[52] U.S. Cl. ...................................... 206/1.5; 206/387
[58] Field of Search ............... 206/1.5, 387, 807, 45.14

[56] References Cited

U.S. PATENT DOCUMENTS

| | | |
|---|---|---|
| 3,828,922 | 8/1974 | Holkestad . |
| 4,589,549 | 5/1986 | Hehn . |
| 4,718,547 | 1/1988 | MacTavish . |
| 4,834,238 | 5/1989 | Hehn et al. . |
| 4,865,190 | 9/1989 | Gregerson et al. . |
| 4,881,645 | 11/1989 | Smiler et al. . |

*Primary Examiner*—Bryon P. Gehman
*Attorney, Agent, or Firm*—Michael Sand Co.

[57] ABSTRACT

A reusable molded plastic package for securely holding and displaying cassettes and in particular audio cassettes. A housing forms a storage compartment and has two pairs of spaced ramps adjacent a front end opening which permits a cassette to be forced past the ramps and into the storage compartment, yet prevent removal of the cassette back out of the compartment through the front end opening. A lock retaining plate is movably mounted on the housing and is movable between a lock position where it covers another opening formed in the top wall of the housing and an unlocked position which enables the cassette to be removed from the storage compartment when sold at a retail store. After sale, the retaining plate can be moved to the locked position enabling the package to be reused with another cassette being loaded into the package by automatic loading equipment through the front end opening. In a modified embodiment an expansion zone is provided in the bottom wall adjacent the front end opening to facilitate the movement of the cassette past the ramps and into the storage compartment by permitting limited outward movement of the ramps.

13 Claims, 6 Drawing Sheets

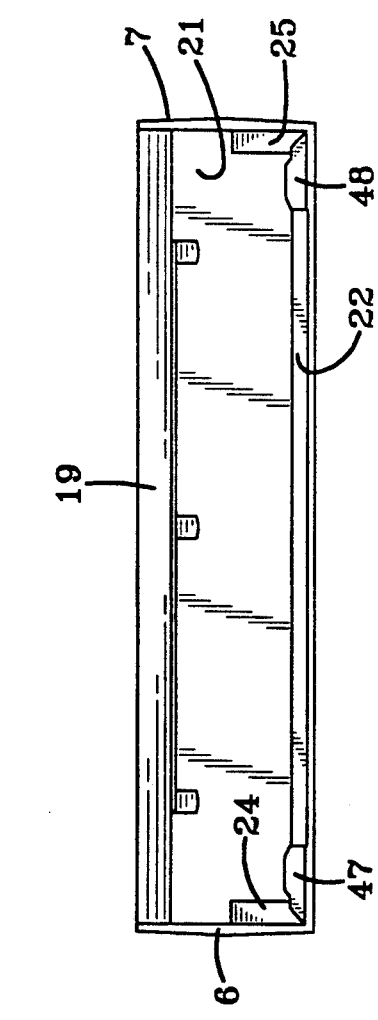
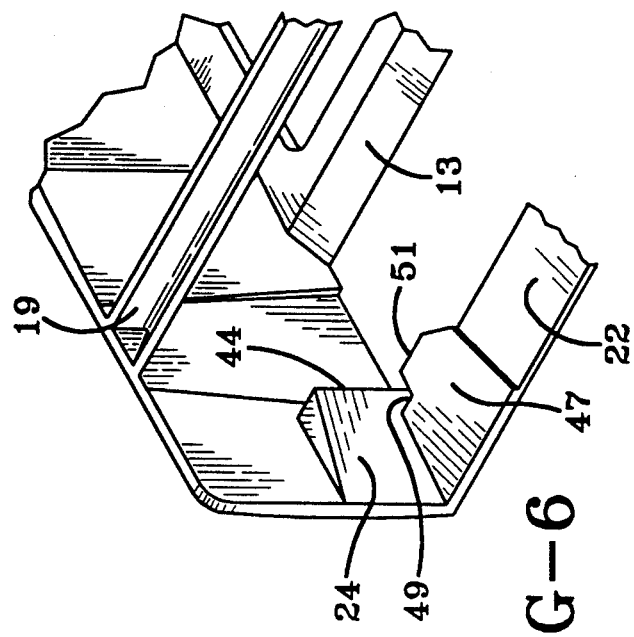
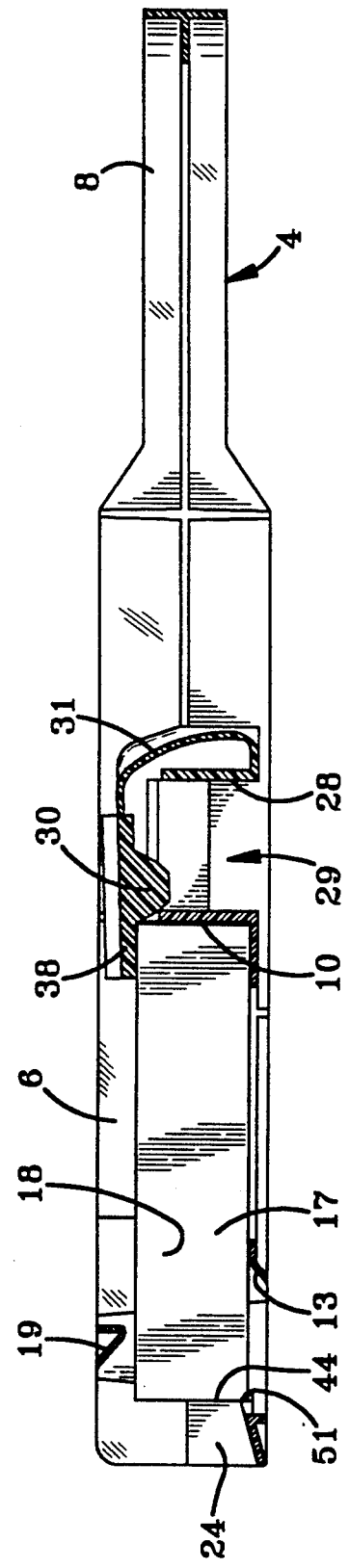

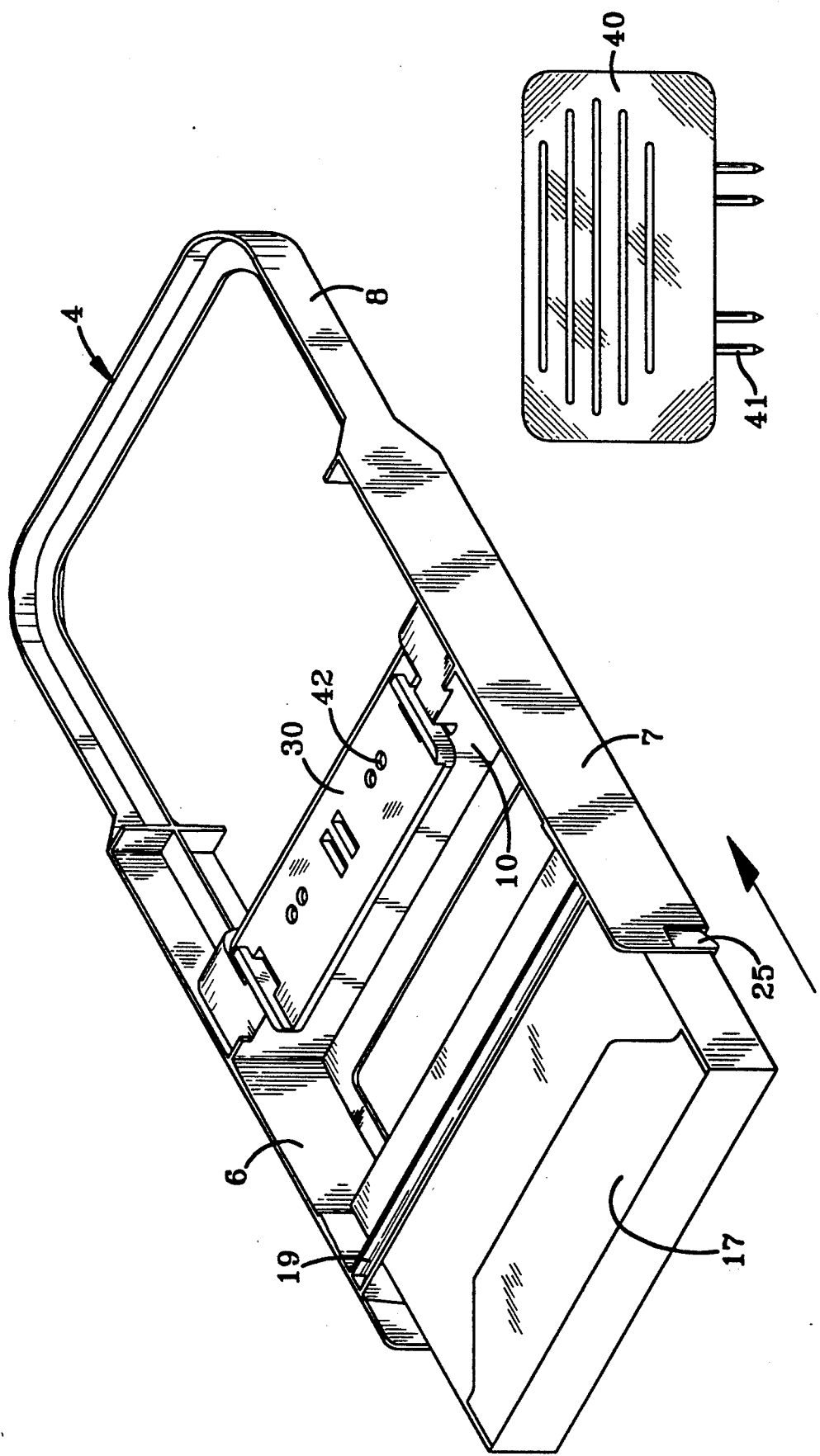

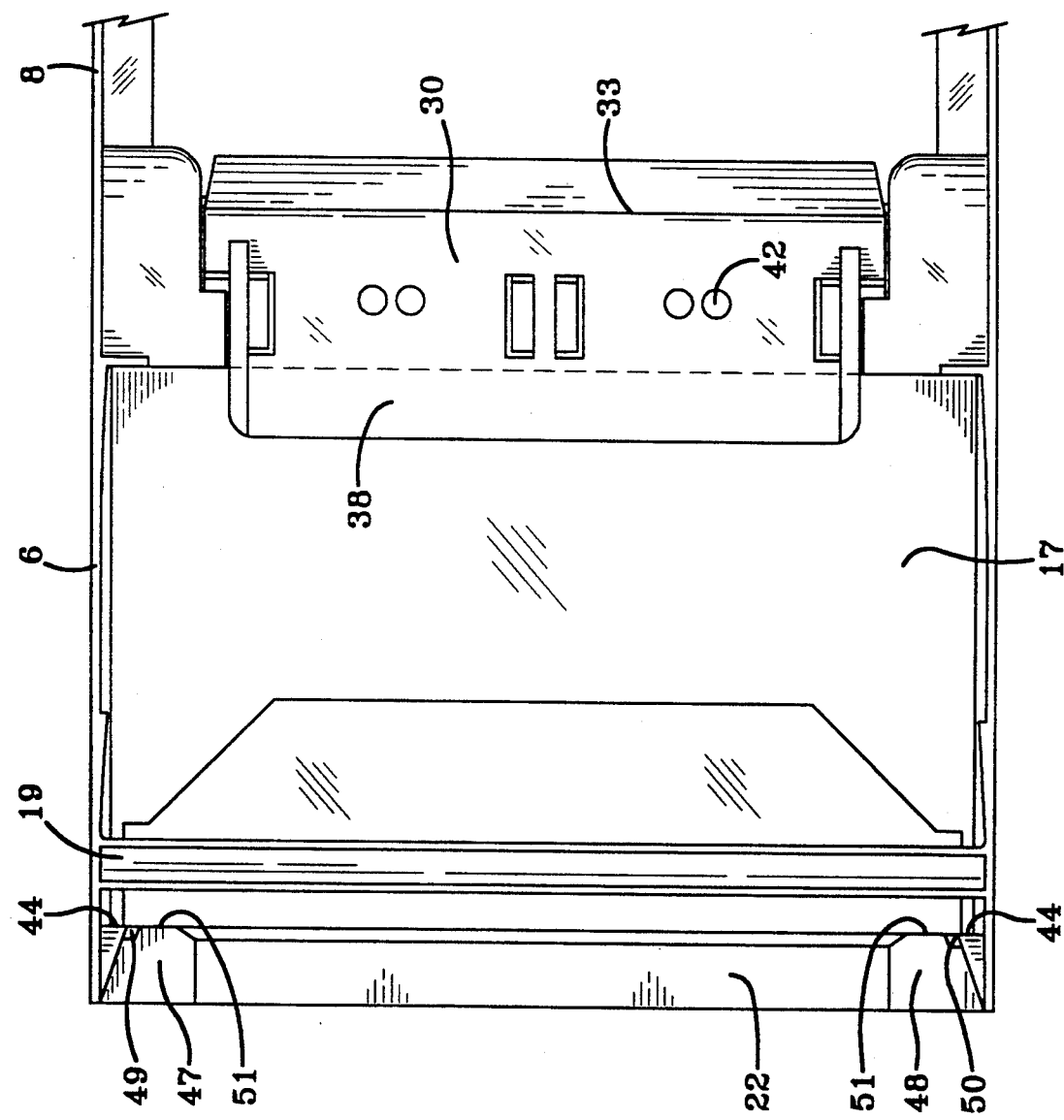

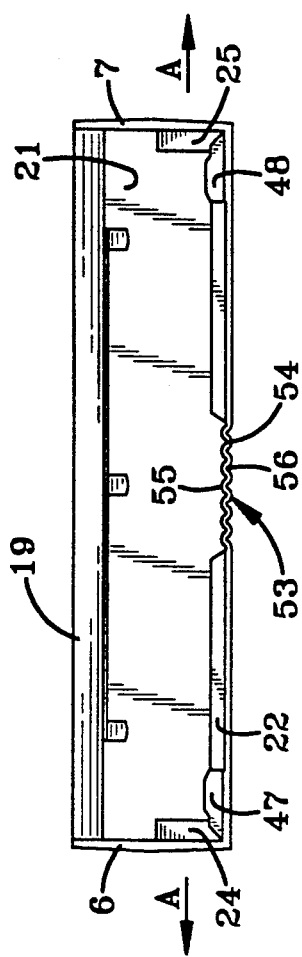
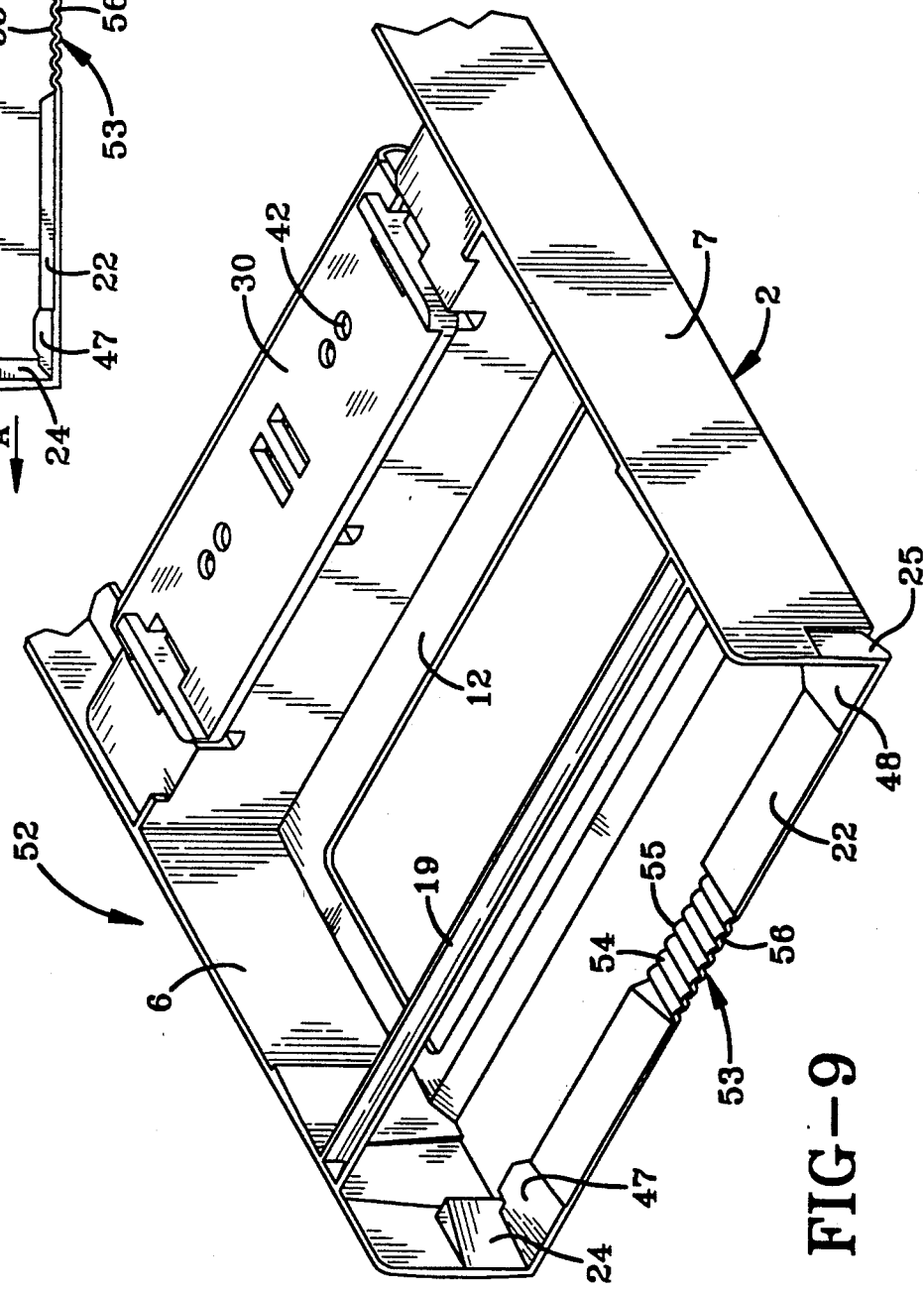

REUSABLE END LOADED CASSETTE SECURITY PACKAGE WITH END EXPANSION MEANS

CROSS REFERENCE TO RELATED APPLICATION

This application is a continuation-in-part of pending application Ser. No. 07/747,296, filed Aug. 19, 1991, now abandoned.

BACKGROUND OF THE INVENTION

1. Technical Field

The invention relates to packages and particularly to a package for holding cassettes. More particularly, the invention relates to a reusable audio security package having an end opening for insertion of the cassette therethrough by automatic loading equipment, wherein the cassette is forced pass flexible ramps into a storage compartment of the package, which ramps prevent removal of the cassette outwardly through the end opening after placement in the storage compartment. More particularly, the invention relates to such a security package in which a top wall opening is locked and unlocked by a movable locking plate to enable the cassette to be removed from the package upon a sale thereof and returned to locked position for subsequent use in an automatic end loading operation.

2. Background Information

In recent years audio cassettes have become increasingly popular and have replaced LP record discs and 8 track audio tapes. The introduction of these cassettes into the audio market presented a problem to the retail sellers in that the cassettes, which are much smaller than the 8 track tapes and record discs, had to be displayed so that perspective purchasers could inspect the same to determine the artist, songs, etc. on the cassette This presents a security problem due to the extremely small size of the audio cassette in contrast to the record discs and 8 track tapes.

Therefore, various packaging arrangements have been devised which enable cassettes, and in particular audio cassettes, to be displayed for sale on usual display racks while retarding removal of the cassette from the package and subsequent theft from the stores. Examples of such packages are shown in U.S. Pat. Nos. 3,871,516, 4,243,142, 4,245,741, 4,285,429, 4,361,233, 4,381,836, 4,466,540, 4,489,832, 4,634,004, 4,567,983, 4,572,369 and 4,635,795. Certain types of these security packages are intended to be reusable such as shown in U.S. Pat. No. 3,828,922 wherein the package is a plastic injection molded housing having depressible ramps which enable the cassette to be forcibly moved beyond the ramps upon entering a storage compartment, yet are resilient enough to prevent removal of the cassette out of the storage compartment unless the ramps are depressed by a key as shown in this patent.

Other types of packages such as shown in U.S. Pat. No. 4,881,645, enables the cassette to be forcibly moved past retaining ramps into the storage compartment yet can only be removed from the storage compartment by complete destruction of the security package. It is desirable for certain applications that the security package be reusable for a cost savings.

Certain large volume audio cassette dealers and wholesalers use automatic equipment for loading the audio cassettes into security packages to reduce the heretofore labor intensive manual insertion of the cassettes into the storage compartments. These automatic loading machines will forcibly insert the cassette through an end wall opening of the package and past the above discussed flexible ramps, afterwhich the cassette is permanently secured within the package and can not be removed unless the package is destroyed. However, as discussed above, it is desirable to reuse these security packages for cost savings.

There is no known security package of which we are aware which enables the package to be used with known automatic loading equipment whereby the cassette is slidably inserted forcibly through an end wall opening and past resilient ramps, yet which enables the cassette to be removed from the security package by use of a releasable locking slide plate or the like, without destroying the package, enabling it to be reused with automatic loading equipment.

SUMMARY OF THE INVENTION

Objectives of the invention include providing an improved cassette package which can be mass produced relatively inexpensively as an integral one-piece or two-piece plastic member, which provides a main housing and cassette storage compartment, and which includes a locking plate either hingedly or slidably mounted on the housing, to enable the cassette to be removed from the housing without destroying the package, enabling it to be reused for subsequent loading and retail display and sale.

Another objective of the invention is to provide such a package in which the printed information on the cassette is visible through enlarged openings formed in the front and back walls of the housing which form the package, and most importantly provides a package in which the cassette can be loaded into the storage compartment by automatic loading equipment through an end wall opening past integrally formed resilient ramps adjacent the end wall opening, which ramps prevent subsequent removal of the cassette back through the end opening.

A further objective is to provide such a security package in which a top wall opening locking plate can be moved to an unlocked position for reuse by a manually operated key, wherein the unlocking mechanism is not easily actuated by other unauthorized foreign objects, such as car keys or similar objects.

A still further objective is to provide such a security package which can be molded of rugged plastic material and reused thereby reducing the cost to the manufacture and distributor of the cassette, and which has an exterior size and configuration which enables the cassette to be stored in usual display racks, yet has sufficient size to hamper the unauthorized concealment and theft thereof.

Another objective is to provide such a security package in which an expansion zone is formed in a portion of the bottom wall adjacent the front end opening to facilitate the loading of the cassette into the storage compartment.

Another objective is to provide such a cassette security package which is of an extremely simple construction, and which achieves the stated objectives in a simple, effective and efficient manner, and which solves problems and satisfies needs in the art.

These and other objectives and advantages of the invention are obtained the improved security package of the invention, the general nature of which may be stated as including an elongated housing having a pair of spaced side walls, a bottom wall, an end wall, and a top wall, forming a cassette storage compartment; a first opening formed in an end of the housing opposite of said end wall through which an article may be slidably inserted into the storage compartment; ramp means molded integrally on the housing adjacent to the end opening, said ramp means being sufficiently flexible to permit the passage of the article through said end opening and into the storage compartment but preventing removal of said article from within said compartment through said end opening; a second opening formed in the top wall of the housing sufficiently large to permit the removal of the article from within the storage compartment; lock means including a retaining plate movably mounted on the housing between locked and unlocked positions, for releasably securing the article in the storage compartment; and key means engageable with the lock means for enabling the retaining plate to be moved to the unlocked position for removing the article from the storage compartment permitting the package to receive another article into the storage container through the end opening and retain said article in the storage compartment when said plate is in the locked position.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 3 is an end elevational view of the front end of said security package;

FIG. 4 is a perspective view similar to FIG. 1 showing a cassette being partially inserted through the front end opening thereof;

FIG. 5 is a side elevational view of the improved security package with portions broken away and in section with an audio cassette being secured therein;

FIG. 6 is an enlarged fragmentary view taken off FIG. 1 showing the front end opening and certain of the retaining ramps;

FIG. 7 is an enlarged fragmentary top plan view showing an audio cassette security within the locked storage compartment of the security package;

FIG. 8 is a perspective view of one type of key for unlocking the security package;

FIG. 9 is a fragmentary perspective view similar to FIG. 1, showing a modified form of the improved security package; and FIG. 10 is an end elevational view of the modified package of FIG. 9.

Similar numerals refer to similar parts throughout the drawings.

DESCRIPTION OF THE PREFERRED EMBODIMENT

Figure 1:
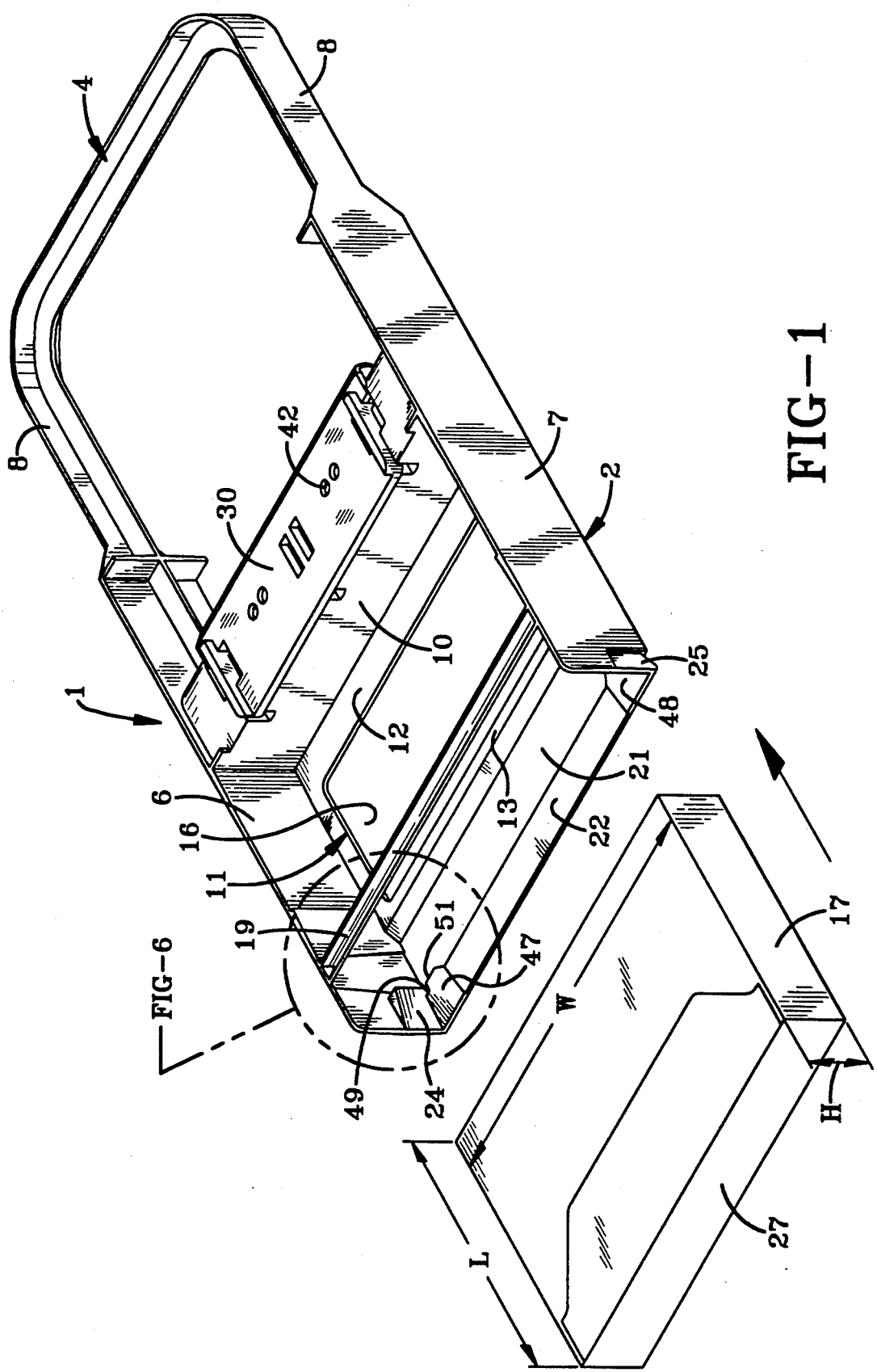
FIG. 1 is a perspective view showing the improved security package prior to an audio cassette being loaded through the front end opening thereof and with the retaining plate in an unlocked open position.

The improved security package is indicated generally at 1, and is shown particularly in FIG. 1. Package 1 preferably is molded as a one-piece plastic unit such as high impact polypropylene or other suitable moldable plastic. Package 1 is similar in many respects to the package of U.S. Pat. No. 4,834,238, the contents of which are incorporated herein by reference.

Package 1 includes a housing indicated generally at 2, formed at one end with a hanger 4 which enables the package to be mounted on display hooks or pegs, and which provides sufficient size to the package making it difficult for a thief to easily conceal the package for unauthorized removal from a retail store.

Housing 2 includes a pair of sidewalls 6 and 7 which merge into sides 8 of hanger 4. Housing 2 further includes a transversely extended rear wall 10 and a partially open bottom wall 11 and together with sidewalls 6 and 7, form a storage compartment 18. Bottom wall 11 includes a transversely extending rear ledge 12 located adjacent rear wall 10, and a forwardly spaced transversely extending ledge 13 and a pair of longitudinally extending side ledges 14 and 15 (FIGS. 1 and 2) which form a rectangular-shaped bottom opening 16 through which the contents of a cassette contained within a usual clear plastic cassette container 17, can be easily viewed by a perspective purchaser. A top wall is formed principally by a bar 19 which extends transversely between sidewalls 6 and 7 spaced slightly forwardly of bottom wall ledge 13 and together with sidewalls 6 and 7 and rear wall 10 form a top wall opening 26.

In accordance with one of the main features of the invention, the front ends of sidewalls 6 and 7 terminates in a front end opening 21 having a transverse width generally equal to the width "W" of audio tape storage container 17, and a height equal to the height "H" of container 17. Bottom wall 11 of housing 2 further includes a transversely extending front end ledge 22 which terminates in a pair of inwardly tapered ramps 24 and 25 which are formed integrally at the front ends of sidewalls 6 and 7, respectively. Ramps 24 and 25 have sufficient flexibility to permit cassette package 17 to be forcibly inserted therebetween as shown in FIG. 4, yet have sufficient rigidity so that when engaged by front end 27 of container 17 as shown in FIG. 5, prevents removal of container 17 from front end opening 21, once container 17 is inserted into storage compartment 18.

In addition to ramps 24 and 25, a second pair of ramps 47 and 48 are formed on front end ledge 22 closely adjacent ramps 24 and 25, respectively. Ramps 24 and 47, and 25 and 48, are separated by grooves 49 and 50, respectively, to provide sufficient flexibility to the front end of housing 2 to permit the passage of a cassette container 17 therethrough. However, the combination of ramps 24-25 and 47-48 prevent removal of container 17 out of front end opening 21 once inserted into storage compartment 18.

Figure 2:
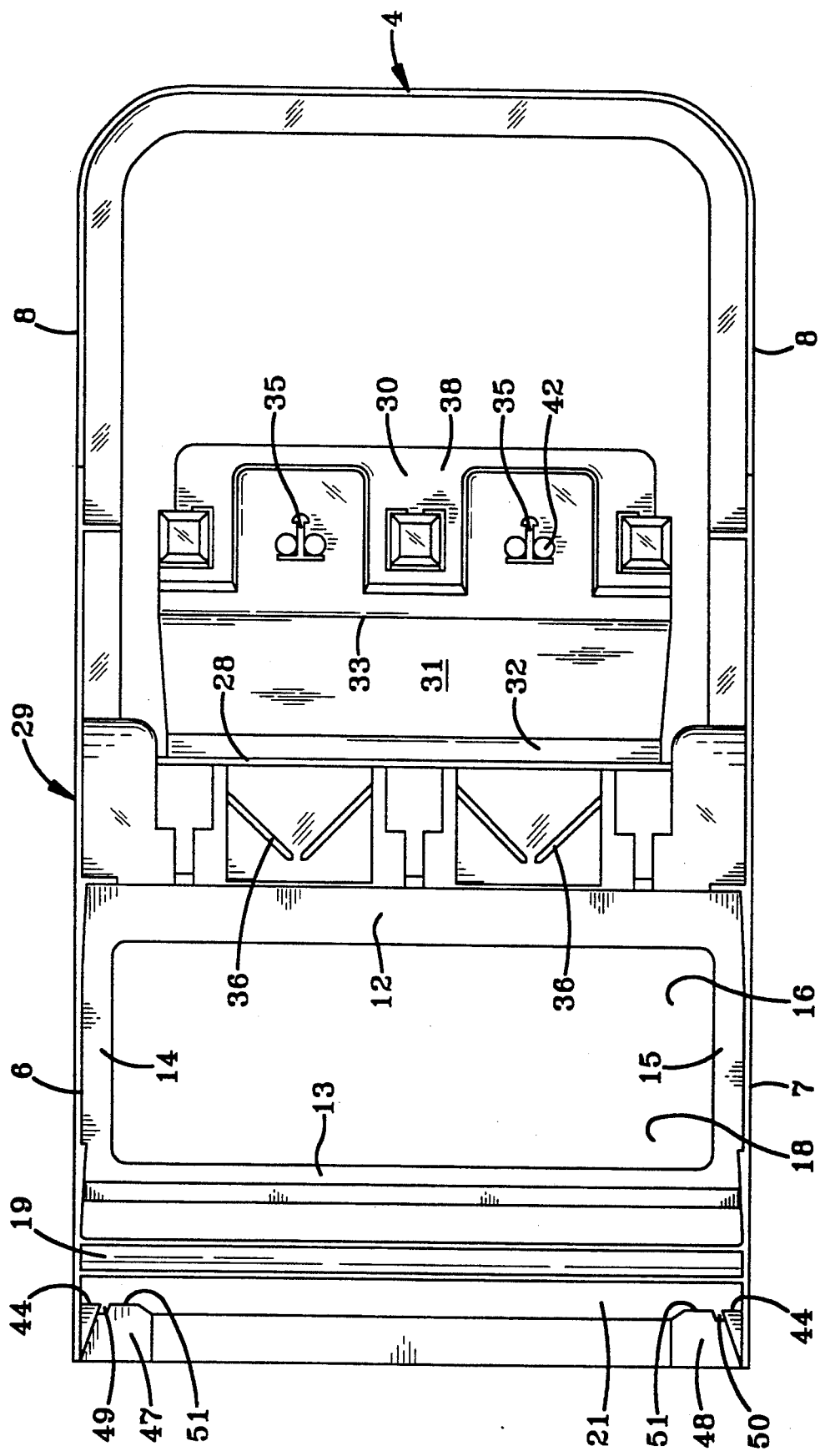
FIG. 2 is a top plan view of the improved security package with the locking plate in full open position.

In accordance with another of the features of the invention, a retaining plate 30 is hingedly mounted on a rear wall 28 of a rectangular shaped lock housing 29 by a double hinged plate 31 (FIG. 2). Plate 31 has a first hinge 32 integral with rear wall 28 and a second hinge 33 which connects hinge plate 31 to retaining plate 30. A pair of locking projections 35 are formed integrally on retaining plate 30 and when moved past angled pairs of locking tabs 36 formed within lock housing 29, secures the forward end 38 of retaining plate 30 over the rear end of cassette container 17 (FIG. 7) when located within storage compartment 18. Plate 30 in combination with top ledge 13 prevents removal of container 17 through top wall opening 26, which opening is generally complementary in size and shape to container 17. The other locking features of retaining plate 30, tabs 36 and lock housing 29 are described in detail in previously identified Pat. No. 4,834,238.

A manually operated key 40 (FIG. 8) has a plurality of tangs 41 which are inserted through pairs of openings 42 for disengaging angled tabs 36 from locking projections 35 enabling plate 30 to be slid rearwardly to an unlocked position as shown in FIG. 1.

As shown in FIG. 1, container 17 is of a usual rectangular configuration having a greater width "W" than length "L". In the preferred embodiment the greater width "W" is inserted longitudinally through end opening 21 and into storage compartment 18. However, package 1 can easily have the longitudinal length of storage compartment 18 align with the longitudinal width "W" of cassette container 17 without affecting the concept of the invention. Also, it is readily seen that package 1 could be used for storing compact discs and videocassettes if desired, without affecting the concept of the invention. However, the preferred use of package 1 is for audio cassette containers 17 since there are various apparatus and equipment currently in use which automatically load the audio cassette and their containers 17 into storage compartment 18 by a sliding ram or the like, through front end opening 21 and forcibly past ramps 24-25 and 47-48 of existing security packages. However, the main problem is that none of these existing security packages for use with automatic loading equipment have any means of removing the cassette container and stored cassette therefrom, without destroying the package. However, in the improved security package 1 of the present invention, the cassette and container are removed easily by moving retaining plate 30 rearwardly to an unlocked position by use of manually actuated key 40. Package 1 then can be reused by merely sliding retaining plate 30 forwardly into its locked position prior to placing it into the automatic loading equipment.

If desired, retaining plate 30 could be replaced with other types of slide retaining plates, such as shown in U.S. Pat. No. 4,589,549, which also is incorporated herein by reference. In this construction the slide plate is a separate member and is slidably mounted on the package for movement across the top of the storage compartment to prevent a cassette container from being removed through the top wall opening when in locked position.

Ramps 24-25 and 47-48 which are molded integrally with the remainder of the security package, will have sufficient flexibility and rearward inclination to permit the cassette container to be forcibly moved therethrough, and after passing retaining edges 44 and 51 thereof, will prevent the outward movement of the container back through opening 21. Furthermore, container 17 is securely retained within storage compartment 18 by the various ledges which form the bottom wall in combination with sidewalls 6 and 7 and top wall 19. However, sufficient openings are provided in the top, bottom and front of the cassette container to enable the various graphics imprinted on the stored cassette to be viewed by a perspective purchaser.

A modified security package is shown in FIGS. 9 and 10 and is indicated generally at 52 and is similar to package 1 except that the front end ledge 22 of bottom wall 11 is formed with an expansion zone indicated generally at 53. Expansion zone 53 is comprised of a plurality of saw-tooth corrugation like members 54 having generally rounded crests 55 and valleys 56. Zone 53 will permit a very limited outward expansion in the direction of arrows A, FIG. 10 to facilitate the loading of a cassette container 17 through front end opening 21 without materially affecting the retention of the cassette within the storage container. Although the expansion of end opening 21 provided by expansion zone 53, will be only several thousands of an inch, it is sufficient to facilitate the insertion of cassette container 17 into storage compartment past ramps 24 and 25. In particular, zone 53 will reduce the tearing of a heat-shrink plastic wrap (not shown) present on many of the cassette containers when being loaded within the security package.

Accordingly, the cassette security package is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cassette security package is constructed and used, the characteristics of the construction, and the advantageous, new and useful results obtained; the new and useful structures, devices, elements, arrangements, parts and combinations, are set forth in the appended claims.

We claim:

1. A security package including:
   a) an elongated housing having a pair of spaced side walls, a bottom wall, an end wall, and a top wall, forming a storage compartment for holding an article therein;
   b) a first opening formed in an end of the housing opposite of the end wall of the storage compartment through which an article is slidably inserted into the storage compartment;
   c) ramp means formed integrally on the housing adjacent to the end opening, said ramp means being sufficiently flexible to permit the passage of an article through said end opening and into the storage compartment but preventing removal of said article from within said compartment through said end opening;
   d) a second opening formed in the top wall of the housing sufficiently large to permit removal of an article from within the storage compartment;
   e) lock means including a retaining plate mounted on the housing and movable between locked and unlocked positions with respect to the second opening, for releasably securing an article in the storage compartment;
   f) key means engageable with the lock means for enabling the retaining plate to be moved to the unlocked position enabling an article to be removed from the storage compartment through the second opening and permitting the package to receive an article into the storage container through the end opening and retain said article in the storage compartment when said plate is placed in the locked position;

g) the bottom wall having an end ledge adjacent to and defining a part of the first opening; and h) a plurality of saw-tooth corrugations formed in said end ledge for allowing limited expansion of said ledge to increase the size of the first opening to facilitate the passage of an article into the storage compartment.

2. The security package defined in claim 1 in which the retaining plate is slidably mounted with respect to the top wall and movable across the second opening between the locked and unlocked position.

3. The security package defined in claim 1 in which the retaining plate is integrally hingedly mounted on the housing.

4. The security package defined in claim 3 in which the retaining plate is slidably engageable with the housing when moving between the locked and unlocked positions.

5. The security package defined in claim 1 in claim 1 in combination with an article adapted to be removably secured in the storage compartment; in which the article is a rectangular-shaped container having a short side and a long side; in which the end wall opening is complementary to the long side whereby the container is inserted sideways into the storage compartment; and in which the second opening is complementary to the long side of the container.

6. The security package defined in claim 1 in which hanger means is formed integrally with the housing for supporting the housing on display; and in which the hanger means extends outwardly from an end of the housing opposite of the first opening in the other end of the housing.

7. The security package defined in claim 1 in which the ramp means includes a first pair of ramps molded integrally on the side walls of the housing.

8. The security package defined in claim 7 in which the ramp means further includes a second pair of ramps molded integrally on the bottom wall of the housing adjacent the first pair of ramps.

9. The security package defined in claim 8 in which each of the first and second pairs of ramps is separated by a groove.

10. The security package defined in claim 1 in which the corrugations have generally rounded crests and valleys.

11. The security package defined in claim 1 in combination with an article adapted to be removably mounted in the storage compartment; and in which said article is an audiocassette.

12. The security package defined in claim 1 in combination with an article adapted to be removably mounted in the storage compartment; and in which said article is a compact disc.

13. A security package including:

a) an elongated housing having a pair of spaced side walls, a bottom wall, an end wall, and a top wall, forming a storage compartment for holding an article therein;

b) an end opening formed in a front end of the housing opposite of the end wall of the storage compartment through which an article is adapted to be slidably inserted into the storage compartment;

c) ramp means molded integrally on the housing adjacent to the front end opening for permitting the passage of an article through said end opening and into the storage compartment but preventing removal of said article from within said compartment through said end opening;

d) a top opening formed in the top wall of the housing sufficiently large to permit removal of an article from within the storage compartment;

e) lock means including a retaining plate movably mounted with respect to the housing and movably between locked and unlocked positions with respect to the top opening, for releasably securing an article in the storage compartment;

f) key means engageably with the lock means for enabling the retaining plate to be moved to the unlocked position for removing an article from within the storage compartment through the top opening;

g) the bottom wall having an end ledge located adjacent to and defining a part of the end opening; and h) expansion means formed in said end ledge for allowing limited expansion of said ledge to increase the longitudinal length thereof, thereby increasing the size of the end opening to facilitate the passage of an article therethrough into the storage compartment.

* * * * *